United States Patent [19]
Reagan

[11] 4,235,314
[45] Nov. 25, 1980

[54] NON-SQUEAL DISC BRAKE

[76] Inventor: Timothy A. Reagan, 527A Bruning La., Chattanooga, Tenn. 37415

[21] Appl. No.: 29,206

[22] Filed: Apr. 12, 1979

[51] Int. Cl.³ .............................................. F16D 65/00
[52] U.S. Cl. .................................... 188/73.5; 188/234
[58] Field of Search ...................... 188/73.1, 73.5, 234, 188/250 B, 250 E, 250 G, 259; 192/30 V

[56] References Cited
U.S. PATENT DOCUMENTS

| 1,941,656 | 1/1934 | Blume | 188/234 |
|---|---|---|---|
| 3,198,294 | 8/1965 | Stacy | 188/250 E X |
| 3,885,651 | 5/1975 | Odier | 188/73.5 |

*Primary Examiner*—Duane A. Reger
*Attorney, Agent, or Firm*—Alan Ruderman

[57] ABSTRACT

A disc brake assembly having a caliper including a hollow piston for acting against the inboard brake pad and a yoke having an open slot on the outboard side has an anti-squeal device including a resilient cylindrical member compressibly secured between the rear face of each brake pad base and a bearing plate. The device is positioned so that it is received within the hollow of the piston on the inboard side and within the slot on the outboard side.

5 Claims, 3 Drawing Figures

NON-SQUEAL DISC BRAKE

BACKGROUND OF THE INVENTION

This invention relates to disc brakes and more particularly to the elimination of "brake squeal" associated with motor vehicle disc brakes upon application of the braking force.

Conventional motor vehicle disc brake systems include a rotatable disc or rotor mounted on the wheel and an nonrotatable member or caliper secured to a support member. The caliper carries a pair of spaced brake pads having load bearing faces of a high friction type of material on either side of the rotor which is sandwiched therebetween. The facing of the pads is bonded, riveted or otherwise secured to a rigid metal base. The caliper includes a housing within which is mounted a piston operable by hydraulic fluid. The piston thrusts against the rear or base side of the inboard pad when the brake is applied to force the facing of the inboard pad against the interior face of the rotor, and the reaction forces on the caliper force the caliper to pull the outboard pad against the other face of the rotor.

A longtime problem associated with disc brakes of this design is the noise or "squeal" that occurs when the brakes are applied. The problem has been recognized by the prior art (see for example U.S. Pat. Nos. 4,075,142; 3,887,044; 3,722,634 and 3,378,116) to eminate from vibrations, whether coupled or not, of the pads, caliper and/or disc. Not only do these vibrations create an annoying noise, but the efficiency of the braking system is reduced by the high frequency oscillatory movement of the pads when the brakes are applied resulting in longer stopping distances than would result with an efficient system. Another effect is that the vibration energy is transmitted into heat energy and since heat reduces brake life and results in brake fading the life of the brakes is less than would otherwise be possible.

Proposed solutions to this problem abound in the art. In U.S. Pat. No. 4,075,142 a chemical coating including a polymeric emulsion is applied to the back of the outboard pad. A spray solution of a material presumably of this type is on the market and provides a temporary fix. In U.S. Pat. No. 3,887,044 an elastic ring is positioned in a radial groove in a bolt adjacent one end and inserted into a bore in the piston with the other end secured to the inboard pad, while the outboard pad has one end of a bolt secured thereto and the other end has a radial groove inserted into a spring secured to the caliper. It thus requires extensive rework, and redesign of the brake system. In U.S. Pat. No. 3,378,116 a disc of resiliant material is bonded to the back of the pad base member, and the solid face piston engages the disc when the brake is actuated. The piston must act against the pad if this system is to be effective. Since pistons today are hollow with a thin wall shell, this construction is ineffective. Moreover, it would require a piston for the outboard pad, which is not today conventional.

SUMMARY OF THE INVENTION

The present invention provides a vibration dampening device for conventional disc brakes which can be easily inexpensively applied to new brake pads or installed on brake pads in motor vehicles now on the roads. In principle, the invention applies a resilient pad against the rear face of the brake pad base member under a compressive stress. When applied to the outboard brake pad the noise or squeal was reduced substantially; when applied to both the outboard and inboard brake pads, the squeal was eliminated.

In carrying out the invention a resilient, preferably rubber or neoprene, member is compressed against the rear of the brake pad base between a bearing plate. A securing member, such as a bolt, engages the bearing plat and is secured into the rear of the pad base to provide the compression to the resilient member. The resilient member preferably may be of cylindrical shape and is received within the bore of the conventional hollow piston for the inboard pad and is received within a slot in the yoke of the conventional caliper for the outboard pad. No external force need be applied to the resilient member to suppress the squeal as the system, once uner the prestress of the bearing plate and securing member, functions independently. No changes to the piston or the caliper are necessitated by the addition of the noise suppressor. Since the noise causing vibrations are eliminated, the vibration generated heat is reduced with the prospect of longer brake life, and a more effecient braking system results.

Consequently, it is a primary object of the present invention to provide a in disc brake assembly a simple and inexpensive device for effectively substantially eliminating the squeal noise generated when the brake is operated.

It is another object of this invention to provide in a disc brake assembly a resilient member positioned against the rear face of the brake pad base and means for compressing and securing the member in said position.

It is a further object of this invention to provide a resilient member compressibly sandwiched between the rear of a disc brake pad and a bearing member for a disc brake assembly.

It is a still further object of the invention to provide in a disc brake assembly having a conventional caliper with a yoke shaped outboard end a hollow piston inboard end, a compressed resilient vibration suppression member on the rear face of each brake pad which is positioned within the opening of the yoke and the bore of the piston respectively.

BRIEF DESCRIPTION OF THE DRAWINGS

The particular features and advantages of the invention as well as other objects will become apparent from the following description taken in connection with the acompanying drawings, in which.

DESCRIPTION OF THE PREFERRED EMBODIMENT

Figure 1:
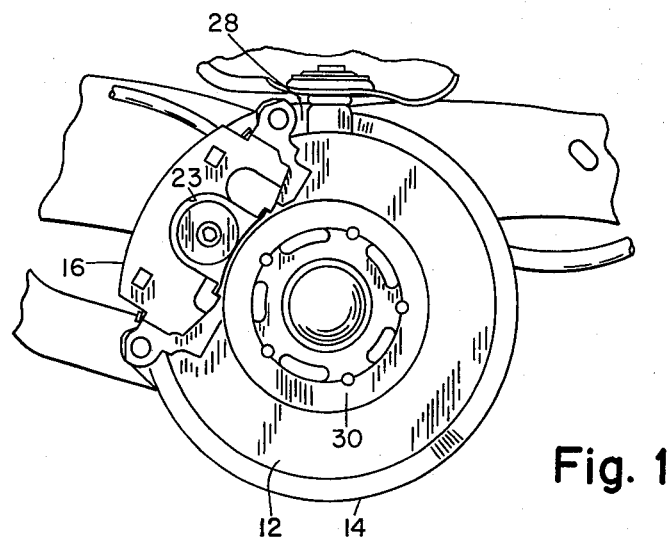
FIG. 1 is a front elevational view of a portion of a motor vehicle wheel well illustrating a disc brake incorporating an anti-squeal device constructed in accordance with the principles of the present invention.
Figure 2:
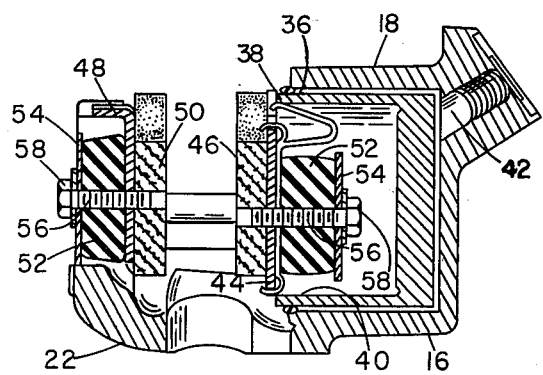
FIG. 2 is a vertical sectional view longitudinally through the caliper assembly shown in FIG. 1.
Figure 3:
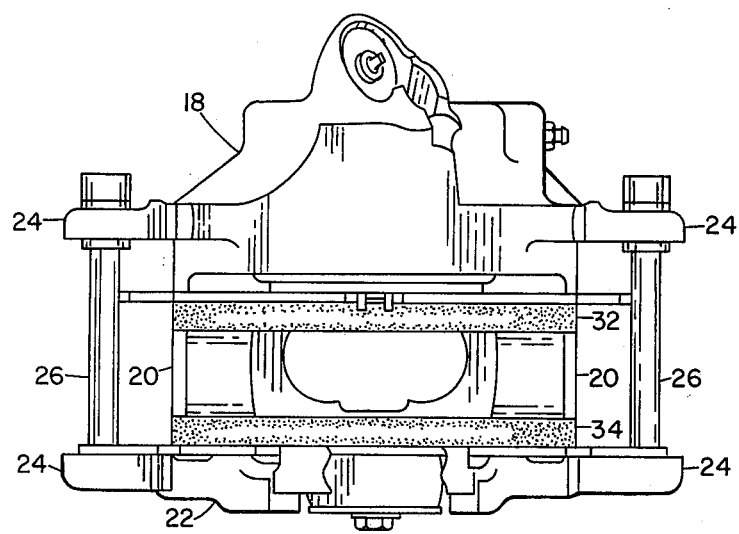
FIG. 3 is a top plan view of the caliper assembly.

Referring to FIG. 1 the disc brake assembly 10 includes a disc or rotor 12 conventionally fixed for rotation with the wheel 14 of the motor vehicle and a caliper 16 which comprises the housing member that carries the remaining elements of the brake. The caliper is a unitary member having a piston housing 18 at the inboard side connected by bridging elements 20 to an outboard yoke portion 22 having an open slot 23. The piston housing and yoke include tabs 24 for receiving bolts 26 which carry the caliper and are secured to supports 28 which in turn are secured to the wheel spindle 30 of the vehicle. The caliper carries an inboard brake pad 32 adjacent the piston housing 18 and an outboard pad 34 adjacent the yoke 22, the pads being positioned on either side of the rotor 12.

Located within the piston housing 18 is a cylindrical bore 36 which receives a piston 38 having a hollow configuration with a central bore 40. A smaller bore 42 opens into the bore 36 to provide an internal passageway for hydraulic fluid to flow into the cylindrical bore for moving the piston when the brakes are applied. At that time the piston forces the inboard pad 32 against the inboard side of the rotor and the reaction force pulls the outboard pad 34 against the outboard side of the rotor.

Each inboard pad 32 comprises a rigid metallic base member or backing 44 to which a pad of friction material 46, such as asbestos is secured as by bonding or rivoting. Similarly the outboard pads have a rigid base member 48 to which a friction pad 50 is attached.

In accordance with the principles of this invention the rear surface of each base member 44 and 48 is provided with a resilient pad 52 preferably rubber or a rubber-like material, e.g. neoprene, which is preferably of a cylindrical configuration. Each pad 52 is prestressed under the compressive force of a bearing plate 54 and secured to the respective base member by a bolt 56 passing through the pad 52 and the plate 54 and threaded into a hole tapped into the rear face of the base member. The head 58 of the bolt acts against the plate 54 to provide the compressive force on the resilient pad sandwiched between the base member and the plate. The resilient pads and bearing plates are of a size such that when they are located in the central portion of the brake pads, they fit within the bore 40 of the hollow piston 38 for the inboard brake pads and the slot 23 of the yoke 22. Thus, the invention can be applied conveniently to any conventional recent model motor vehicle disc brake assembly.

During operational testing of a noise suppressor constructed as above described, it was determined that squeal was substantially reduced when the resiliant pad was mounted on the outboard pad, and was substantially eliminated when applied to both the inboard and the outboard brake pads.

Numerous alterations of the structure herein disclosed will suggest themselves to those skilled in the art. However it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus described the nature of the invention, what is claimed herein is:

1. A disc brake comprising a rotatable disc, a caliper having means straddling a portion of the periphery of said disc, a brake pad supported by the caliper at each face of the disc, each brake pad having a rigid base member and a pad of friction material secured to a face thereof, each pad of friction material facing said disc, an axially movable piston in the caliper hydraulically movable into engagement with the base member of one of said pads to force said pads of friction material into braking engagement with said disc, a resilient member abutting the base member of at least one of said brake pads remote from said pad of friction material, and means for compressing and securing said resilient member against said base member for dampening vibrations of said base member, said means comprising a bearing plate and means for securing said bearing plate to said base material, said resilient member being sandwiched between said base material and said bearing plate and being thicker than said bearing plate in the direction therebetween.

2. A disc brake as recited in claim 1 wherein a resilient member is compressibly secured to the base member of each brake pad.

3. A disc brake comprising a rotatable disc, a caliper having means straddling a portion of the periphery of said disc, a brake pad supported by the caliper at each face of the disc, each brake pad having a rigid base member and a pad of friction material secured thereto, each pad of friction material facing said disc, an axially movable piston in the caliper adjacent one of said pads hydraulically movable into engagement with the base member of said one pad to force said pads of friction material into braking engagement with said disc, said piston having an internal bore opening toward said one pad, said caliper having a yoke supporting the other brake pad and facing the brake member thereof, said yoke having a slot opening onto the base member of the supported brake pad, a resilient member abutting the base member of each of said brake pads, a bearing plate abutting each resilient member, means for securing each bearing plate to the respective base member and for compressing said resilient member between said base member and said bearing plate, said resilient members and bearing plates being disposed within the respective piston bore and yoke slot.

4. A disc brake as recited in claim 3 wherein said resilient members are cylindrical and said bearing plates are disc shaped.

5. A disc brake as recited in claim 2 wherein said resilient members and plates have a substantially centrally disposed bore, and said means for securing said bearing plate to said base member comprise bolt means acting against said plate and passing through said bores into threaded engagement with the base member.

* * * * *